(12) United States Patent
Abrams et al.

(10) Patent No.: US 6,544,634 B1
(45) Date of Patent: Apr. 8, 2003

(54) GRAPHIC IMAGE FUSION

(75) Inventors: Fredric Louis Abrams, Dayton, OH (US); Robert Frank Freund, Waynesville, OH (US)

(73) Assignee: Pinnacle Products Group, Ltd., Dayton, OH (US)

( * ) Notice: Subject to any disclaimer, the term of this patent is extended or adjusted under 35 U.S.C. 154(b) by 0 days.

(21) Appl. No.: 09/521,127

(22) Filed: Mar. 7, 2000

Related U.S. Application Data

(60) Provisional application No. 60/125,316, filed on Mar. 19, 1999.

(51) Int. Cl.[7] .................................................. B32B 7/02
(52) U.S. Cl. .................... 428/212; 428/304.4; 428/328; 428/542.2; 428/913.3
(58) Field of Search ................................ 428/195, 212, 428/304.4, 328, 542.2, 913.3

(56) References Cited

U.S. PATENT DOCUMENTS

| | | | |
|---|---|---|---|
| 4,330,578 A | * | 5/1982 | Nishihira et al. ............. 428/13 |
| 4,369,157 A | | 1/1983 | Conner |
| 4,418,033 A | | 11/1983 | Hatakeyama |
| 4,427,615 A | | 1/1984 | Eskesen |
| 4,650,533 A | | 3/1987 | Parker et al. |
| 4,808,366 A | | 2/1989 | Kaminski et al. |
| 4,861,644 A | | 8/1989 | Young et al. |
| 4,892,779 A | | 1/1990 | Leatherman et al. |
| 4,983,348 A | | 1/1991 | Barresi et al. |
| 5,227,222 A | | 7/1993 | Ogawa et al. |
| 5,338,396 A | | 8/1994 | Abdala et al. |
| 5,512,227 A | | 4/1996 | Grazioli |
| 5,514,427 A | | 5/1996 | Ellison et al. |
| 5,536,539 A | | 7/1996 | Ellison et al. |
| 5,591,384 A | | 1/1997 | Abrams et al. |
| 5,626,339 A | | 5/1997 | Schickert et al. |
| 5,629,029 A | | 5/1997 | Souder et al. |
| 5,637,329 A | | 6/1997 | Abrams et al. |
| 5,658,672 A | * | 8/1997 | Lenke et al. ............. 428/423.1 |
| 5,676,981 A | | 10/1997 | Miyazawa et al. |
| 5,698,283 A | | 12/1997 | Yamasaki et al. |
| 5,705,255 A | | 1/1998 | Grazioli |
| 5,707,472 A | | 1/1998 | Smith |
| 5,795,527 A | | 8/1998 | Nakamura et al. |
| 5,800,757 A | | 9/1998 | Abrams et al. |
| 6,007,759 A | | 12/1999 | Ten Tije et al. |

* cited by examiner

*Primary Examiner*—Cynthia H. Kelly
*Assistant Examiner*—B. Shewareged
(74) *Attorney, Agent, or Firm*—Killworth, Gottman, Hagan & Schaeff, L.L.P.

(57) ABSTRACT

An in-mold and in-line decorating method is disclosed which, using a single sheet layer, allows the placement of the highest possible quality graphics into the surface of products made from a variety of moldable thermoplastic, thermoset, and vulcanizable materials using a variety of molding processes. The methods also provide new or improved capabilities for product identification, safety, and serialized tracking.

18 Claims, No Drawings

GRAPHIC IMAGE FUSION

CROSS REFERENCE TO RELATED APPLICATIONS

The application claims the benefit of U.S. provisional application Serial No. 60/125,316 filed Mar. 19, 1999.

BACKGROUND OF THE INVENTION

The present invention is directed to creating in-mold and in-line decorated articles having higher quality than previously attainable, greater permanence than previously available, using molding techniques previously excluded, using processes and materials previously excluded, and offering improvements in yield, throughput and scrap rates. The present invention provides images of near photographic quality that are highly resistant to fading, chemicals and abrasion that can be produced using both thermoplastic and thermosetting processes. The present invention makes possible new in mold and in-line capabilities and provides new or improved opportunities for product decoration and for product labeling where permanence, long life, safety labeling, product identification, ownership or serialization labels, or production lot identification is needed.

Product manufacturers place a high value on the ability to deliver a product with a high quality graphic surface. This has traditionally required a trade-off between the quality of the image and the permanence of the image and its print media. The highest quality achievable has been to lithographically print adhesive labels, which are applied after aforesaid articles have been molded. These suffer from poor adhesion to many types of materials resulting in decorative labels that peel and degrade the appearance of the product. Loss of adhesion is exacerbated by environmental factors such as moisture and large changes in temperature and is particularly acute in outdoor applications. The loss of labels containing safety related information is obviously a much more serious issue. Labels on products used by small children also present a choke hazard should the labels come off. In many cases information is placed onto the article using other post-molding decorating techniques such as heat transfer and pad and screen printing. These techniques result in the lowest quality image and are generally limited to one or two colors in relatively non-complex designs. In many cases, an image such as a logo or lettering is actually a part of the mold creating a raised area that receives the transferred color. Both of these techniques also add complexity to the manufacturing process by adding a post-molding step wherein the article is given its graphic image. Not only do these techniques add cost and manufacturing cycle time, but aforesaid techniques also introduce opportunities to convert a part into a quality reject if the image application is not done perfectly. Neither adhesive labels nor post mold decorating techniques involving transfer of image or color can effectively decorate over compound curvature areas or the sides of raised areas. Current art is essentially limited to flat or single curvature surfaces.

The shortfalls inherent in aforesaid post molding decorating techniques have resulted in the development of in-mold decorating techniques. In-mold decorating is characterized by the preparation of graphics, normally using screen-printing techniques on a polymer film material of composition compatible with the polymer to be used in molding the part. The film traditionally used for said in mold decorating is clear allowing the underlying molded polymer to show through. Many techniques use complex multi-layered films in an attempt to achieve a satisfactory in-moldable product. The printed film is normally placed into the mold so that the molten polymer flows over the ink, which is trapped between said film and said polymer. Temperatures and pressures characteristic of said technique drives requirements for screen printing inks that can withstand said process. The graphic detail quality achievable by said techniques is limited by the environment in which said inks must remain stable and not wash out or flow with the molten polymer. The cost of screen printing, with the requirement to separately deposit each color, results in total costs that diminish the competitiveness of in-mold decorated products made using said technique.

There is a plurality of reasons why yields of good parts are lower than desired by manufacturers when using said in-mold decorating. Causative factors include damage to the graphic image on the surface of the sheet during placement or molding, damage to the sheet itself during molding and lack of stability of the printed sheet in the mold during molding. Said graphic image damage results primarily from the robustness of the inks and lack of protection of same from the temperatures and pressures common in said molding processes. Said sheet damage results primarily from stretching or penetration of said sheet during molding due to the pressures of molding and the flow of molten materials over the sheets to their edges. Said lack of stability involves the movement of said printed sheet within the mold due primarily to the flow of molten material over said sheet causing said sheet to slide with respect to the mold surface or to lift from said mold surface. Said sliding results from insufficient coefficient of friction between said sheet and said mold surface. Said lifting results from said sheet presenting too much cross section to the flowing molten material, particularly when the entry of said molten material is not within the boundaries of said graphic sheet and said molten material must impinge upon the vertical edge of said printed sheet. Said lifting problem is exacerbated by thicker printed sheets, which may be used to provide the needed tensile properties. Common techniques used to enhance said stability include inducing electrostatic charges between said sheet and said mold surface to prevent movement during molding, texturing said mold surface to increase friction between said sheet and said mold surface, and use of detents or pockets in the mold to constrain said printed sheet. Problems inherent in using said electrostatic charge techniques include the inability to maintain said charge at a high enough level and for a long enough period to properly complete the molding process. The dissipation of said charge is accelerated by the typical marginal dielectric characteristics of said printed sheet. Said surface texturing and use of detents or pockets are currently the best available options either used in lieu of or in concert with said electrostatic charging.

Some of the shortcomings of both post molding decorating and traditional in-mold decorating have been partially overcome in the area of thermoplastic compression molded products where a printed sheet has molten polymeric material fused to its non graphic surface. Compression molding using a billet approach falls into the category of a low stress technique thereby overcoming the problems inherent in highly tortuous techniques such as injection molding. U.S. Pat. No. 4,861,644 disclosed the printing using various techniques, including offset lithography, of microporous substrates. U.S. Pat. No. 4,892,779 discloses the fusion of a printed microporous sheet to other materials using a variety of molding techniques. Disclosed, but not claimed is injection and blow molding of polyolefins. U.S. Pat. Nos. 5,591,384, 5,626,339, 5,637,329, and 5,800,757 all disclose the manufacture of thermoplastic products with graphics molded into the surface of the product during manufacture using low stress molding techniques such as compression and structural foam molding. These patents cite the use of polymers which are compatible with the polymer used to make the sheet which is in-molded to said polymer. While U.S. Pat. No. 5,512,227 discloses use of polyolefin films and U.S. Pat. Nos. 4,418,033, 4,650,533, 5,227,222, 5,338,396, 5,514,427, 5,536,539, 5,698,283, 5,705,255, 5,707,472, and 5,795,527 disclose use of non-polyolefin films in injection molding applications, they demand a multi-layer "sandwich," some involving adhesives to be an effective method of in-molding graphics during injection molding. Several of these techniques also require post-molding stripping of carrier sheets or layers from the finished part. Other patents, such as U.S. Pat. No. 5,676,981, require specialized techniques such as heating the graphic sheet to assure good adhesion and stability during the injection molding process. Other techniques such as described in U.S. Pat. No. 4,418,033 and U.S. Pat. No. 4,369,157 require a continuous strip of in mold decorating material to be repeatedly advanced between each mold closure; this routinely introduces errors in alignment of the image to the part resulting in a quality reject. Still other techniques such as disclosed in U.S. Pat. No. 4,330,578 and U.S. Pat. No. 5,629,029 require specialized molds or double injection steps to accomplish the in-mold decorating operation. Still other techniques for blow molding such as disclosed in U.S. Pat. No. 4,808,366 and U.S. Pat. No. 4,983,348 do not result in actual permanent fusion attachment of the graphic image sheet to the finished part. Still other techniques such as disclosed in U.S. Pat. No. 4,427,615 require pins in the mold upon which to hang the printed sheet to be inmolded.

In summary, existing methods of achieving said in-molded graphics generally depend on the similarity of materials between the graphically printed film and the substrate material to which the graphic is molded. Said methods address only thermoplastic applications. Where the use of dissimilar materials is disclosed there are complex techniques, such as multi-layering, required to affect the molding. The current state of the art offers no techniques for in-mold decorating with lithographically printed images using high stress manufacturing techniques such as injection molding. Since the majority of current molding is injection, there is a need for a method of economically achieving high yield, high throughput in-mold decorating manufacture of high quality graphic products. The current state of the art offers no techniques for introduction of a three dimensional graphic into the cavity of a mold to produce a dimensional part decorated in the mold with graphics on all top and side surfaces. Since most polymeric materials undergo shrinkage during post-molding cooling, there are issues with in-mold decorating techniques not matching the shrink rate; the current state of the art does not offer techniques for in-mold decorating where the image will automatically exhibit the same shrink rate as the polymer into which it is molded.

SUMMARY OF THE INVENTION

In order to overcome the deficiencies in prior art it is necessary that a method be developed to provide a system solution. The system solution of the present invention provides a printable sheet of not greater than ten mil thickness that can survive the tortuous injection molding environment and which is in-moldable with a wide variety of thermoplastic and thermoset materials; a family of inks that produce the highest quality images and can survive the molding process while also exhibiting excellent flexibility and resistance to fading in UV light; a family of coatings that aid the molding process and provide added permanence to the printed image in abrasive, chemical, or UV light exposure environments; a printed and coated sheet that can, if needed, be thermoformed to fit a complex mold face geometry; techniques for efficiently and positively placing and holding the printed sheet in the mold; high stability of the printed sheet in the mold during molding; and which is effective in a wide variety of molding techniques.

The system of the present invention exhibits the ability to place the aforesaid mentioned single layer printed and coated sheet into molds heretofore used for undecorated product manufacture and to produce an in-mold decorated product.

With respect to said printable sheet, there is a plurality of precipitated silica filled micro-porous sheet materials commercially available in the marketplace. Such materials exhibit varying degrees of robustness in the tortuous injection-molding environment. Material sold by PPG Industries, Pittsburgh, Pa. under the trade name MiST™ is, when properly coated as explained herein, found to be satisfactory for the most demanding molding environments including thermoset applications where the material will be exposed to high temperatures for extended time periods for curing. Other materials, such as Daramic™ manufactured by Daramic, Inc. of Owensboro, Ky. are generally satisfactory for thermoplastic injection molding applications if treated using coatings to improve their tensile properties and stability in the mold. Use of surface treatment coatings make ten mil thickness material suitable in all applications and makes seven thickness material suitable in many applications.

With respect to said inks, there are families of satisfactory lithographic, gravure, flexographic, and screen inks available in the marketplace from a number of sources by referring to inks suitable for use with PPG Industries Teslin® printable sheet. The use of such inks is an essential element in obtaining a quality print on silica-filled microporous sheet materials. Reference is made to the Grafusion™ series of lithographic inks and the GRA series of screen inks which have been optimized for the aforementioned silica filled micro-porous materials and which demonstrate the flexibility and robustness to provide and maintain a high quality image through a tortuous injection molding process. Both of these series of inks exhibit exceptional fade resistance in prolonged UV exposure. These inks are available from Pinnacle Products Group, Ltd. of Dayton, Ohio. Such inks comprise a pigment and carrier which are formulated to withstand temperatures of up to 600° F.

With respect to said coatings, there are families of UV energy cross-linkable coatings that provide the said printed silica-filled microporous materials with the performance enhancements essential for successful high yield molding of articles. By the nature of their molecular level changes during curing such coatings enhance the tensile properties of the printed sheets reducing the tendency of the sheet to stretch as molten material flows over the sheet to its edges. Increasing the tensile properties also allows the use of thinner material such as seven mil thickness; this is important because it reduces the cross section presented at the sheet edge where an excessive thickness induces disruption of the material flow causing said sheet to lift from the mold surface. The increases in tensile properties are also of value in minimizing stretch thus making the printed sheets usable in a continuous roll fed sheet extrusion process where graphics are fused to extrudate as it is produced. By the nature of the molecular changes that occur during curing the coatings also protect the ink during the molding process and provide said printed sheets with an increased surface coefficient of friction which significantly enhances the stability of the printed sheet within the mold during tortuous molding processes. Such sheet stability lowers the potential movement or float of the printed sheet as molten material flows over the sheet to its edges; the stability is essential to achieving high yield during tortuous molding processes. The increased coefficient of friction is also an essential performance factor if the printed articles are to be used in underfoot applications where slip resistance is an important safety issue. When needed such coatings can be formulated, and are commercially available which also enhance the resistance of the printed sheets from degradation by chemicals such as petroleum distillates and solvents which could contact the surface of the product in many applications. When needed such coatings can also be formulated and are commercially available to enhance the resistance of any of the products to color fading from protracted exposure to UV light in outdoor or other high sunlight exposure applications. Such coatings also provide suitable dielectric performance so that printed and coated sheets can be held in the mold cavities using electrostatic means without the degradation or dissipation of the electrostatic charge prior to mold closure and completion of the molding process. Satisfactory, but not optimum, UV curable coatings are available from a number of sources by specifying a clear coat that will adhere to lithographic printed images and which exhibits whatever performance factors such as those cited above are needed for the specific application. A suitable series of such coatings has been optimized to enhance the most important properties for the majority of product applications is the GRA series of coatings, which are clear variants of the screen inks previously cited. These coatings are available from Pinnacle Products Group, Ltd. of Dayton Ohio. Such coatings are UV crosslinkable coatings containing an acrylate ester.

The invention makes possible many new capabilities and opens many new opportunities in the field of in-mold decorating. First, the invention allows improving the quality of images that can be in-molded by implementing offset lithography, flexographic and gravure printing as options. Second, the invention provides in-molding approaches that are easier to implement and have lower production costs by enhancing the effectiveness of electrostatic adhesion and often allowing in-molding without modifying molds. Third, the invention provides products and images which are more robust and durable, particularly in the areas of UV induced fading, abrasion, and slip resistance in underfoot applications. Fourth, the invention provides methods that lower the scrap rates from unsuccessful attempts by improving the stability of the in-mold graphic element during molding and by positive fusion of the graphic element into the surface of the molded part. Fifth, the invention provides for implementation with minimum impact on production process cycle times, including the implementation of robotic handling, hence making in-mold decorating more cost competitive. Sixth, the invention provides the ability to implement in-mold decoration in thermosetting and vulcanization applications opening a plurality of new products to such decoration. Seventh, the invention provides for implementing in-mold and in-line decorating in a wider range of molding techniques including extrusion and thermoforming while simplifying injection molding and blow molding. Eighth, the invention provides a plurality of new options for decorated molded products through such applications as the manufacture of polyolefin products that can be screen printed without using specialized inks or corona treatments, the ability to attach metallized foils to molded parts, and the ability to attach pressure sensitive adhesive materials such as reflective tape to materials to which they would not otherwise adhere. Ninth, the invention provides new or improved opportunities for permanent product labeling in thermoplastic, thermosetting, and vulcanizable product applications allowing in-molding of safety labels, product identification labels, product serialization labels, product ownership labels for security purposes, part number labels, life cycle tracking labels, and production lot identification labels containing text, logos, graphics or barcodes. Tenth, the invention provides for identifying that said products have been altered or misused, thus providing an added security feature to the finished molded product. Eleventh, the invention allows for the in-mold decoration of deep dimensional and three dimensional molded parts. Twelfth, the invention eliminates concerns over the differences in polymer shrink rates between an in-moldable label and the polymer to which it is molded. Lastly, the invention allows manufacturers of an in-mold decorated product to have the image assume the texture of the underlying molded material as imparted by the mold surface due to the inherent flexibility of the sheet materials used.

Accordingly, it is an object of the present invention to provide methods for in-mold decorating which provides high quality images onto extruded and molded parts, and to provide products produced by those methods. These, and other features and advantages, will become apparent from the following detailed description and the appended claims.

DETAILED DESCRIPTION OF THE INVENTION

The present invention is illustrated by the following representative, but non-limiting, examples.

EXAMPLE 1

A sheet of PPG Industries MIST® ten mil thick material is printed using offset lithography with a four color process image using inks from the Grafusion™ series available from Pinnacle Products Group, Ltd., Dayton, Ohio. The printed image is then coated via screen printing using GRA-C501 coating also available from Pinnacle Products and is fed into the lower gap of a sheet extrusion line roll stack with its printed surface against the lower roller containing a leatherette texture and its reverse side coming in contact with a thermoplastic rubber material derived primarily from recycled truck tires. This continuously operating in-line process produces a rubber mat with a high quality image fused into its surface. The graphic image has the leatherette texture, the printed and coated film having conformed to said leatherette texture. The graphic image displays no fading in outdoor exposure to sunlight after six months. The coating prevents serious degradation to the graphic image from scuffing abrasion from foot traffic. Laboratory measurements of the coefficient of friction using ASTM D-2047 discloses a value of 0.80, well above the threshold of 0.50 to qualify as slip resistant in underfoot applications. The mat is usable as an underfoot advertising product in outdoor and underfoot applications. The graphic completely covers the unattractive surface of the recycled content material thereby presenting an aesthetically pleasing product.

EXAMPLE 2

A sheet of PPG Industries MiST® seven mil thick material is printed with a using offset lithography four color process image using inks from the Grafusion™ series. The printed image is then coated via screen printing using GRA-C501 coating and is then die cut to the shape of a control panel label. The die cut piece is then positioned in the cavity of an injection mold and is electrostatically treated using a Tantec High Voltage Electrostatic Charging Device. The mold is then closed and the control panel part is injection molded using polypropylene. When the mold opens a control panel part containing said graphic fused into the appropriate part of its surface is ejected. This example demonstrates the capability of the invention to replace post molding decorating where prior state of the art in-mold decorating techniques were unable to provide a satisfactory solution. The resulting part is suitable for use by the customer in lieu of a part where previously an adhesive label had been applied in a post molding operation.

EXAMPLE 3

A sheet of PPG Industries MiST® ten mil thick material is printed with text, a logo, and a unique serialized barcode using a high temperature carbon ink ribbon in an Intermec 4440 printer. The sheet is then scored with an intersecting cross hatch. The printed and scored sheet is then given a silicone coating on the printed side. The rear side of the printed sheet is coated with unvulcanized rubber and said sheet is placed on the sidewall of an unvulcanized tire. The tire then undergoes vulcanization producing a finished tire containing a permanent label providing tire ownership information and serialization for tracking the tire during the remaining manufacturing steps and as part of a tire inventory throughout its useful life. The tire with label attached undergoes temperature and flexure testing to simulate on the road conditions and the label remains intact. The label is cleaned using gasoline and typical solvents such as toluene, heptane, and methyl-ethyl-ketone and it shows no degradation of the image with the barcode remaining readable using automatic barcode reading equipment. This example demonstrates the capability of the invention to place a permanent and durable in-mold decoration onto a part in a thermosetting process. The product provides the tire owner with increased security against theft of his tires and a method of tracking the use and recapping of the tire throughout its useful life. The cross hatch cutting has resulted in a label that flexes, but does not permanently deform in extreme flexure, with the tire while in use.

EXAMPLE 4

A sheet of PPG Industries MIST® seven mil thick material is gravure with a wood grain pattern and coated with GRA-C501 coating. A piece of this sheet is placed onto the core surface of an unmodified mold designed to make a refrigerator ice tray and is treated electrostatically to hold it in place. The mold is closed and a part is injection molded using ABS plastic. The molding process produces an ABS ice tray with a wood grain finish using a polyolefin printed sheet. The test demonstrates the capability of the invention in molding of dissimilar materials and the ability to hold an in-mold graphic sheet on the core of an injection mold where it is subjected to the most tortuous forces. The finished part offers the customer the capability to place a permanent instruction label on the part in production.

EXAMPLE 5

A sheet of seven mil thick PPG Industries MIST® material is printed with a four color process lithographic image using inks from the Grafusion™ series. The printed image is then coated using GRA-003 coating available from Pinnacle Products Group, Ltd., Dayton, Ohio. The sheet is then placed on the vertical cavity wall of a 30 gallon refuse container mold and held in place using electrostatic treatment. The mold is then closed and a twenty pound part is injection molded using polyolefins. The molding produces a refuse container containing a high quality durable and abrasion image molded on its side. The process demonstrates the stability of the in mold graphic on a smooth surface within the mold where a high volume of high pressure molten material must flow past the graphic to fill the mold. The process further demonstrates the effectiveness of the invention in performing in-mold graphic decoration without changes to the mold or molding equipment. The process provides the customer with a method of customizing such containers for individual communities.

EXAMPLE 6

A sheet of ten mil thick Daramic™ material available from Daramic, Inc., Owensboro, Ky. is printed lithographically with a four color process image using inks from the Grafusion™ series. The printed image is then coated first with GRA-C501 and then with GRA-003 coatings and is fed into the lower gap of a sheet extrusion line roll stack with its printed surface against the lower roller containing a leatherette texture and its reverse side coming in contact with a proprietary thermoplastic rubber material derived primarily from recycled truck tires. This continuously operating in-line process produces a rubber mat with a high quality image fused into its surface and a v-grooved back which is cut to the appropriate size for use as a truck mud flap. The product is then installed on a truck for in service testing where the mud flap and its image display satisfactory abrasion and fade resistance in a high stress environment for six months. The mud flap product provides the capability to carry a photographic quality image on a mud flap for advertising purposes.

EXAMPLE 7

A sheet of ten mil MiST™ material has an aluminum metallized material available from Kurz-Hastings Corporation deposited thereupon using heat lamination creating an in-moldable sheet of MiST™ with an aluminum metallized surface. The sheet of metallized surface MiST™ is then placed into the cavity of an injection mold opposite the injection gate and a part is molded using polycarbonate. The resulting part is produced having a metallized and acceptably reflective permanent surface for use in the headlight assembly of a lawn tractor. The sheet of MiST™ material creates a vehicle for permanent attachment of the metallized surface to a product where said metallized surface could not otherwise be permanently attached.

EXAMPLE 8

A sheet of ten mil MiST™ material is printed with a set of ten process color images using a Xerox Docutech® color laser printer and is then coated with GRA-C501. The images are then die cut from the sheet and are placed one at a time in an injection mold and a part is molded using ABS plastic. The parts that are produced contain a permanent in-molded full color image and are usable for placement on other products as a manufacturer identifying plaquard.

EXAMPLE 9

A sheet of ten mil Daramic™ material is printed via offset lithography four color process using Grafusion series inks and is then screen coated using GRA-C501 coating. The sheet is then fused into the surface of rubber derived from recycled tires via a sheet extrusion process. The resulting graphic product then has adhesive reflective tape pressed onto its surface producing a graphic product with a reflective border where said reflective tape will not adhere to said rubber of said product produced without said graphic molded into its surface.

EXAMPLE 10

A sheet of ten mil Daramic™ material is printed via offset lithography using Grafusion series inks and is then screen coated using GRA-C501 coating. The sheet is then placed in the cavity of a mold designed for blow molding a water bottle and is momentarily exposed to electrostatic energy. The mold is then closed and a bottle is blow molded using polyethylene. When the mold is opened a bottle with a permanent image fused into its surface is removed.

EXAMPLE 11

A sheet of PPG Industries MiST® ten mil thick material is printed with text, a logo, and a unique serialized barcode using a high temperature carbon ink ribbon in an Intermec 4440 printer and is then coated using GRA-C501 coating. The printed and coated sheet is then placed in a thermoforming mold with a sheet of polyethylene and a part is molded using vacuum forming. When the mold is opened the part has a permanent barcode label fused into its surface.

EXAMPLE 12

A sheet of ten mil MIST™ material has a metallized material commercially available from API Foils, Inc. deposited thereupon creating an in-moldable sheet of MiST™ with a metallized surface. Said sheet of metallized surface MiST™ is die cut to an appropriate size and scored so that it will fold over the 0.25 inch thick edges of a part 2.5 inches by 4.5 inches. The die cut sheet is then placed into the cavity of an injection mold and a part is molded using polycarbonate. The resulting part is produced having a permanent metallic appearing surface for use as the cover plate for an electrical wall switch but without the safety need to assure electrical grounding of said cover plate. The sheet of coated MiST™ material creates a part that appears to be metal but which is non-conductive electrically.

EXAMPLE 13

A sheet of seven mil MiST™ material has a gold, red and chrome metallized material commercially available from Kurz-Hastings Corporation deposited thereupon in the form of a logo creating an in-moldable sheet of MiST™ carrying a metallized logo on its surface. The sheet of metallized surface MiST™ is coated using GRA-C501 coating and is then placed into the cavity of an injection mold and a part is molded using thermoplastic rubber. When the mold is opened an automotive airbag cover containing a metallized color logo is permanently fused into the surface and the airbag cover is ready for installation in an automobile for which the logo is appropriate.

EXAMPLE 14

Multiple sheets of ten mil MIST© material are lithographically printed using Grafusion™ series inks with a NASCAR© image using and are then coated with GRA-C502 coating using a Steinemann Roll Coating machine. The printed and coated image are then die cut to a shape that can be folded into a three dimensional representation of the specific race car design. Some of the cut pieces are folded over a fixture with overlapping edges and held in place while a hot tip controlled at 400 degrees F. is run across the joints. The overlapping edges weld together producing a permanently formed three-dimensional representation of the racecar. Other sheets are folded into the desired three dimensional shape and tack welded using a Branson Model 420 Ultrasonic Welder. Both types of welded image sheets are then placed into the cavity of a mold in the shape of a racecar. The mold is closed and polypropylene at 380 degrees F. is injected into the mold producing parts in the shape of a racecar with identifying graphics molded into their surfaces. The in mold decorated parts are then used as lids for beverage coolers.

EXAMPLE 15

A roll of ten mil Daramic™ material, ten inches wide is printed via four color process flexography and is then screen coated using GRA-C501 coating at the end of the flexographic process. The roll is then separated into individual images that are placed in the cavity of a mold designed for injection molding a carrying case and is momentarily exposed to electrostatic energy. The mold is then closed and a case is molded using polypropylene. When the mold is opened a case with a permanent image fused into its surface is removed.

EXAMPLE 16

A sheet of ten mil Daramic™ material is printed via offset lithography using Grafusion inks and is then screen coated using GRA-C501 coating. The sheet is then placed in the cavity of a mold designed for injection molding the cover for a vacuum cleaner; the sheet is placed over an area in the mold intended to produce a raised logo on the molded part that would have post molding decoration using heat transfer of foil. The sheet is momentarily exposed to electrostatic energy to hold it in position and the mold is then closed and a part is molded using ABS plastic. When the mold is opened a part with a permanent image fused into its surface is removed; the in-molded graphic image has conformed to and completely covered the top and sides of the raised logo area. A post molding decorating process, heat transfer of metallic foil, is performed placing the foil decoration on top of the in-molded graphic in the raised logo areas.

EXAMPLE 17

A sheet of ten mil Daramic™ material is printed via offset lithography using Grafusion yellow and black inks creating a sheet of caution labels of a type mandated by law for attachment to the lids of municipal waste containers. The printed sheet is then screen coated using GRA-C501 coating. The sheet is then placed die cut producing individual labels which are then placed in a cassette holder sized for the labels by Geiger Robotic Handling Company. A robotic arm with appropriate end of arm tool made by Geiger then removes one label from the cassette using suction and transfers it the mold cavity of an injection mold designed to mold a trash container lid. The end of arm holds the label in position while an electrostatic wand element of the end of arm tool applies electrostatic energy to pin the graphic against the mold surface. The robot then withdraws, the mold closes, and polyethylene is injected into the cavity of a mold. When the mold opens a lid containing the mandated permanent labels is ejected.

EXAMPLE 18

A sheet of then mil MIST® material is printed using four color process offset lithography with a set of advertising images and then printed on the reverse side of each image with a logo, text and a telephone number using 50% density cyan color ink. The four color process printed surface is screen coated with GRA-C501 coating material. The sheet is then die cut into individual labels having a four color image coated side and a single color uncoated side. A label is placed into a mold designed to produce the lid for a storage box with the four color side against the mold face and is pinned in position using electrostatic energy. The mold is then closed and crystal styrene is injected against the one color printed side of the label. When the mold opens the process has produced a transparent lid with a four color label on showing on its top and a one color image showing and readable through the transparent lid material when the box is opened.

EXAMPLE 19

A sheet of unprinted 10 mil MIST® is fused to the surface of a rubber sheet during extrusion. The sheet is then cut to a specified shape and placed in an injection mold with the rubber against the mold surface and the MIST® side exposed to the injection of polypropylene. When the polypropylene is injected it fuses to the MIST® and creates a part that is part rubber and part plastic having a permanent bond, without adhesives, between two materials that would not normally bond to one another. The resulting product approximates a shoe sole.

EXAMPLE 20

One side of a sheet of 10 mil thick Daramic material is coated using heat lamination with an electrically conductive film. The sheet is then fused to the surface of a rubber sheet during extrusion. The result is a flexible product containing a surface that exhibits electrical conductivity and can serve as a circuit or an electromagnetic/electrostatic shield.

EXAMPLE 21

A sheet of 10 mil thick MIST® is four color offset lithographic printed with left and right view photographic mallard duck images produced using distortion printing where the image is compressed in designated areas. The sheet is then coated using screen printing with GRA-C501 coating. The printed and coated sheet is then vacuum formed to the dimensions of a duck decoy causing the distortion printed areas to assume normal color and proportion. The vacuum formed printed sheet is cut into left and right view pieces which are then placed in the appropriate cavities of a blow mold and molded with polyethylene. When the mold is opened two halves of a duck decoy having a photographic quality image are removed and mated to form a finished decoy. The process replaces hand painting of each decoy with a lesser quality image and demonstrates the ability to mold graphics to deeply dimensional products providing higher quality at lower cost than the previous method.

EXAMPLE 22

A sheet of 10 mil thick MIST is printed using four color process offset lithography with an image approximating the appearance of stainless steel. The printed sheet is then coated using screen printing with GRA-C501 coating and die cut to the desired shape. The cut sheet is then placed in a mold and structural foam molded using Norell® polyphenol-oxide to produce a part usable as a bank safety deposit door having the appearance of stainless steel. This demonstrates the ability of the method to allow use of high performance polymers in applications where the polymer provides the needed performance but the market perception demands an appearance other than plastic.

The foregoing examples when taken together demonstrate that said invention has provided an in-mold decorating system that offers a plurality of capabilities not present in the prior state of the art. Said system implements in-mold decorating with a single layer sheet of material printed and coated using standard printing and coating techniques and moldable in molds heretofore not used for in-mold decorated parts, said molds needing no modification. The system provided by said methods described herein has allowed in-mold decorating to be applied in thermoset applications where no process or system was previously available. The system provided by the methods described herein has provided the capability to use electrostatic treatment to hold in-mold decorations in place in the most demanding environments. The system provided by said methods described herein has provided the capability of adding in-mold graphic decoration without changes to molds or equipment. The system provided herein has provided the capability to attach layers of material to products where previously said layers could not be made to adhere to the material from which the products were manufactured.

What is claimed is:

1. An article produced by the steps of: introducing a single layer microporous sheet having a first and a second surface and containing a printed and over-coated image on the first surface into a mold, contacting the second surface of said single layer microporous sheet with a thermoplastic polymer, and permanently fusing said single layer microporous sheet into the surface of said polymer during the molding process to produce an in-mold decorated article.

2. The article of claim 1 where said article is selected from the group consisting of a table top, a chair, a control panel, a logo label, a molded toy, a fishing lure, a molded carrying case, a lampshade, a trash container, a tool housing, a vacuum cleaner, a case for a compact disk or DVD, mailbox, a child safety seat, toilet seat, an enclosure for a dart board, a container for cosmetics, a barrel for transporting or storing chemicals, a plate intended to hold food, a cup or tumbler intended to hold a beverage, the door of a safety deposit box, a water-fowl decoy, a chute on a lawn mower, a three dimensional lid for a beverage cooler, an escutcheon panel for an appliance, a cover plate for a wall mounted electrical switch or outlet, and the opaque surround area of a clear plastic projection lens.

3. The article of claim 2 where said image is created using a method selected from the group consisting of lithography, screen printing, flexography, high resolution ink-jet printing, and color or monochrome electrostatic laser printing.

4. The article of claim 2 where said thermoplastic polymer is recycled plastic.

5. An article produced by the steps of: introducing a single layer microporous sheet having a first and a second surface and containing a printed and over-coated image on the first surface into a mold, contacting the second surface of said single layer microporous sheet with a thermosetting or vulcanizable material, and permanently fusing said single layer microporous sheet into the surface of said material during a thermosetting or vulcanization molding process to produce an in-mold decorated article.

6. The article of claim 5 where said molding process is selected from the group consisting of injection molding, vulcanization and compression molding.

7. The article of claim 5 where said article is selected from the group consisting of tires, belts, housings and enclosures.

8. The article of claim 5 where said printed image is selected from the group consisting of barcodes, logos, text, numbers, and metallic appearance graphics.

9. The article of claim 5 where said over-coated image is formed by coating the printed image with a material which prevents damage to said image from exposure to petroleum distillate materials.

10. The article of claim 5 where said article is selected from the group consisting of truck mud flaps, signs, and underfoot advertising mats.

11. The article of claim 5 where said article exhibits a coefficient of friction greater than 0.60 as measured under ASTM 2047.

12. The article of claim 5 where said vulcanizable material is derived from over 50% recycled tires.

13. An article produced by the steps of: providing a silica filled microporous polymer sheet having a first surface and a second surface, applying a metallic material to the first surface of said silica filled microporous polymer sheet, introducing said sheet into a mold or extrusion device, contacting the second surface of said sheet with a polymer, and permanently fusing said sheet into the surface of said polymer during a thermoplastic or thermoset molding process.

14. The article of claim 13 where said article is selected from the group consisting of reflective element of a light assembly, a mirror in a cosmetic container, and electrical circuit, and an electromagnetic shield.

15. An article produced by the steps of: introducing a silica filled microporous sheet into a mold, contacting said sheet with a first polymer and permanently fusing said sheet material into the surface of said first polymer during a molding process to produce a surface to which a second and dissimilar polymer can be fused creating a bond between dissimilar polymers.

16. The article of claim 15 where said first polymer and said second and dissimilar polymer are selected from the group consisting of a polyolefin plastic with acrylonitrile-butadiene-styrene and rubber with plastic.

17. An article produced by the steps of: introducing a silica filled microporous sheet into a mold, contacting said sheet with a polymer, and permanently fusing said sheet into the surface of said polymer during a molding process to produce a molded surface capable of accepting adhesives for attachment of other materials to the molded surface.

18. The article of claim 17 further including a reflective laminate adhesively attached to said molded surface.

* * * * *